United States Patent [19]

Fiorina et al.

[11] Patent Number: 5,477,091
[45] Date of Patent: Dec. 19, 1995

[54] HIGH QUALITY ELECTRICAL POWER DISTRIBUTION SYSTEM

[75] Inventors: Jean-Noël Fiorina, Seyssinet-Pariset; Jean-Jacques Pillet, St. Egreve, both of France

[73] Assignee: Merlin Gerin, France

[21] Appl. No.: 971,224

[22] Filed: Nov. 4, 1992

[30] Foreign Application Priority Data

Nov. 27, 1991 [FR] France .................................. 91 14768

[51] Int. Cl.$^6$ .................................. H02J 3/36; H02J 9/00
[52] U.S. Cl. .................................. 307/66; 307/26; 307/46; 307/82; 340/310.01
[58] Field of Search .................................. 307/18, 22, 23, 307/26, 44, 45, 46, 48, 58, 72, 64–66, 80, 82, 38, 40; 340/310 R, 310 A, 310 CD, 310.01, 310.08; 363/16, 131, 39, 40, 37, 35, 71; 371/66; 365/227–229

[56] References Cited

U.S. PATENT DOCUMENTS

| | | | |
|---|---|---|---|
| 4,639,714 | 1/1987 | Crowe | 340/310 R |
| 4,817,037 | 3/1989 | Hoffman et al. | 395/325 |
| 4,998,024 | 3/1991 | Kirk et al. | 307/38 |
| 5,006,973 | 4/1991 | Turner | 363/37 |
| 5,117,324 | 5/1992 | Johnson, Jr. | 307/66 |
| 5,191,520 | 3/1993 | Eckersky | 307/38 |
| 5,198,698 | 3/1993 | Paul et al. | 307/64 |
| 5,216,357 | 6/1993 | Coppola et al. | 365/229 |
| 5,262,935 | 11/1993 | Shirahama et al. | 363/71 |
| 5,285,029 | 2/1994 | Araki | 363/37 |

FOREIGN PATENT DOCUMENTS

| | | |
|---|---|---|
| 0409226A3 | 1/1991 | European Pat. Off. . |
| 2111326 | 6/1983 | United Kingdom . |
| 2169160 | 7/1986 | United Kingdom . |
| 90/09050 | 8/1990 | WIPO . |

OTHER PUBLICATIONS

By Danner et al., "Alimentation Statique sans Interruption a Sortie Continue", 1989, Paris, France, pp. 29–34.
By Chigolet, "Les Applications des Alimentations sand Interruption dans les Telecommunications", 1989, Paris, France, pp. 17–22.

*Primary Examiner*—William M. Shoop, Jr.
*Assistant Examiner*—Richard T. Elms
*Attorney, Agent, or Firm*—Parkhurst, Wendel & Rossi

[57] ABSTRACT

The system comprises a central module supplying a distribution network, for example formed by a bus, with permanent DC power. Terminal modules, located near the loads, convert the DC power distributed by the distribution network into DC or AC electrical power adapted to the requirements of each load. A communication bus enables data communication between the various modules.

15 Claims, 9 Drawing Sheets

HIGH QUALITY ELECTRICAL POWER DISTRIBUTION SYSTEM

BACKGROUND OF THE INVENTION

The invention relates to a system for distribution of high quality electrical power to a plurality of loads from an AC electrical power distribution network.

An increasingly large number of equipment items, for example in the computer and electronic fields, require a high quality electrical power supply, i.e. essentially a power supply that is always available, well-suited to the equipment and insensitive to disturbances.

The availability problem is at present generally solved by means of an Uninterruptible Power Supply (UPS) connected between the AC mains (50 Hz or 60 Hz) and the equipment involved. Power is distributed to the equipment by the UPS in the form of alternating current of preset frequency and amplitude, generally of the same order as those of the initial power network. The UPS comprises a battery, normally charged by the network, which takes over in the event of network outages for a limited time, about half an hour for example. In the event of network outages of long duration, an electrical generating set or a second power network can, in back-up configuration, be connected to the input of the UPS instead of the network which has become unavailable.

To avoid the costly and cumbersome use of one UPS per item of equipment, a single UPS of suitable power is often provided, associated with a plurality of equipment, or loads, connected in parallel to the output of the UPS. If the power supplied is available, its quality is not always sufficient. Indeed, in this configuration some loads can create disturbances affecting the loads connected in parallel. These reciprocal disturbances can be limited by the use, line-side of each of the equipment items, of harmonic filters and/or isolating transformers, which again makes the installation costly and complex.

SUMMARY OF THE INVENTION

The object of the invention is to achieve a high quality electrical power distribution system which does not present these drawbacks.

This object is achieved by the fact that the power distribution system according to the invention comprises a central module converting the alternating current of the AC network into direct current and comprising at least one autonomous back-up DC power source so as to constitute a permanent DC power source, a DC distribution network connected to the central module, a plurality of terminal modules connected to the DC distribution network, located near the loads to which they are connected and converting the DC current from the DC distribution network into AC or DC current suitable for said loads, and communication means for communicating data representative of the state of the system at least between each terminal module and the central module.

This system is particularly well suited to distribution of high quality electrical power in an office block or on an industrial or tertiary site. The system comprises a central module for the block or site, and the DC distribution network, which is for example formed by a bus, makes this power available to each load. One or more terminal modules, of lower power than the central module and therefore of small dimensions, can be provided in each office, each terminal module being suited to the particular requirements of the load, notably in terms of frequency (AC: 50 Hz, 60 Hz or other; DC) and amplitude (220 V or other). A terminal module can be designed for supply of one or more sensitive equipment items. The terminal modules ensure total functional isolation between the loads connected to different terminal modules and guarantee, under normal operating conditions, the quality of the voltage supplied to the load. In practice, each office of a block will be supplied on the one hand by the conventional AC network and on the other hand by the high quality DC network. Such a system has the advantage of being evolutive, the number and type of terminal modules connected to the DC distribution bus being easily able to be modified according to requirements.

BRIEF DESCRIPTION OF THE DRAWINGS

Other advantages and features will become more clearly apparent from the following description of illustrative embodiments of the invention, given as non-restrictive examples only and represented in the accompanying drawings in which.

DESCRIPTION OF THE PREFERRED EMBODIMENT

Figure 1:
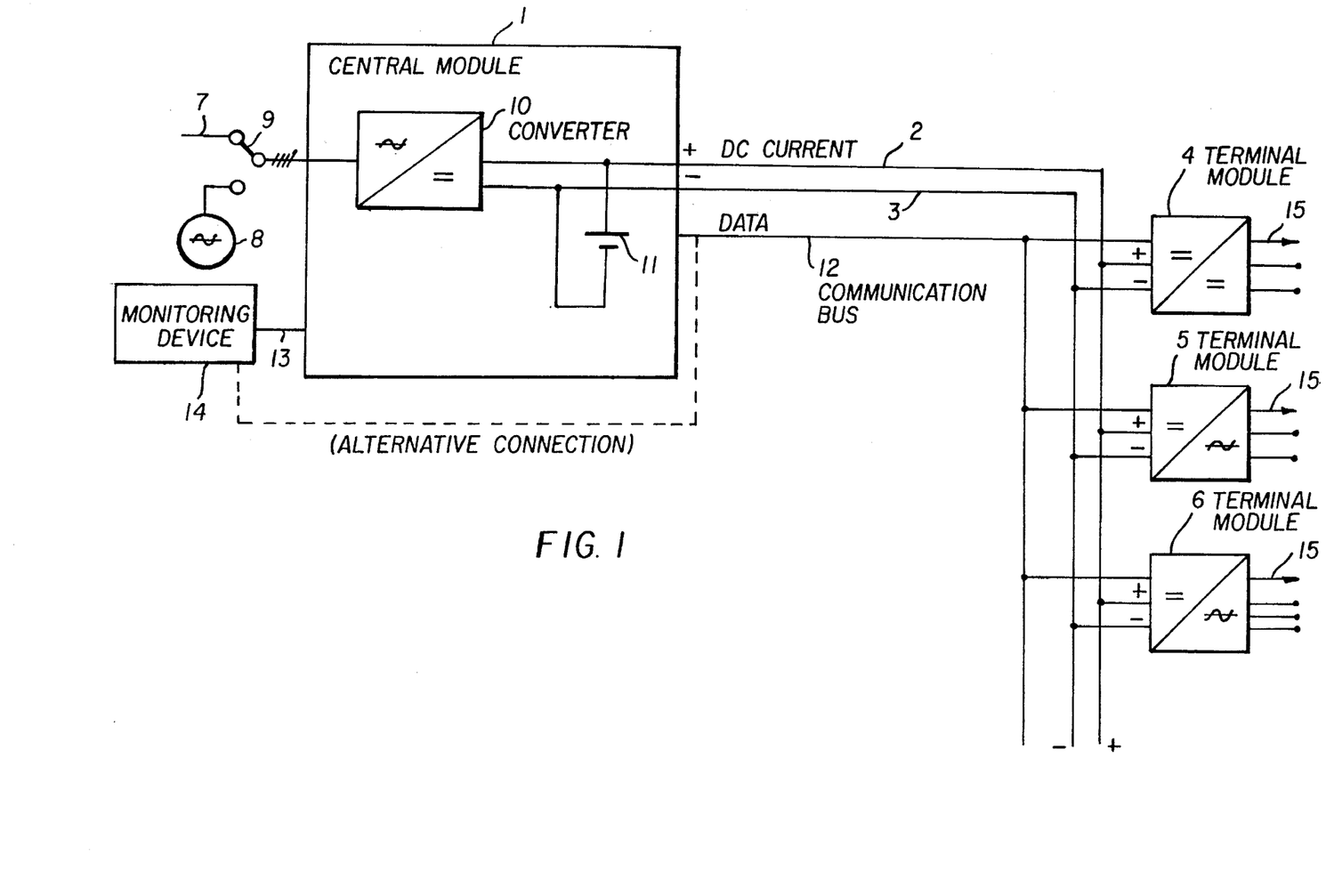
FIG. 1 illustrates in very schematic manner a system according to the invention.

The distribution system illustrated in FIG. 1 comprises a central module 1 supplying a DC power distribution network. The structure of the DC power distribution network is adapted to suit the layout of the site to be equipped so as to distribute direct current to all the user points, for example to the offices of an office block or to the buildings on an industrial estate. High performances are not required from the DC power distribution network since it does not participate directly in achieving final quality. For the sake of examples, the structure of the DC power distribution network can be a star, loop, or rake-connected structure, etc. .

In the particular embodiment represented in the figures, it is formed by a DC distribution bus schematically represented by two conductors, respectively positive (2) and negative (3). Terminal modules, three (4, 5, 6) of which are represented in FIG. 1, are connected to the distribution bus.

The central module 1 is supplied with electrical power from an AC distribution network 7. An emergency back-up source, for example an electrical generating set 8, can be connected via a switch 9 to the input of the central module in case of extended outage of the network 7.

The central module 1 essentially comprises an AC-DC converter 10 and an autonomous DC power source, in the form of a battery 11, parallel connected to the output of the converter 10. It thus constitutes a permanent DC power source, which is always available. The battery back-up time is adapted to suit the conditions of use of the system. This back-up time is typically variable between about 1 and 120 minutes, the electrical generating set 8 taking over in case of extended outage of the network 7.

Near to each user point, the power, in the form of permanently available direct current, is transformed locally, individually, into high quality electrical power. This is accomplished by means of terminal modules, constituted by DC-DC or DC-AC converters, of suitable power. The function of the terminal modules is on the one hand to generate the high quality voltage suitable for the associated load in terms of amplitude, frequency and distortion ratio notably, and on the other hand to provide functional isolation of the loads from one another. Conversion of power from a DC network automatically ensures functional isolation between the loads connected load-side of the different converters. The disturbances, harmonics, short-circuits, etc., created by a load are in fact not transmitted line-side to the DC distribution network and can therefore not be transmitted by the DC network to the other loads. The converter moreover guarantees the quality of the power it supplies on the load side even in the presence of disturbances line-side on the DC network.

In the particular embodiment represented in FIG. 1, the terminal module 4 is a DC-DC converter supplying the associated load with DC electrical power, which can be regulated to have a preset amplitude. The terminal modules 5 and 6 are DC-AC converters supplying respectively single- and three-phase AC voltages of preset frequency and amplitude.

According to their power and the layout of the building, the terminal modules are installed either in a box or directly in current sockets. A terminal module housed in a connection box can, via a high quality local distribution network, supply a certain number of equipment items located nearby. To prevent downgrading of the quality of the power supplied to the load, this local network must be limited in length, number of feeders and number of protective devices.

Low power terminal modules, for example with a power less than 500 VA, can be built into sockets and be fed from a branch distribution bus, connected to the distribution bus by a connection box and concealed in the skirting boards, raised floors or partitions of the premises to be supplied. In some cases, a terminal module can be built directly into a device to be fed.

In all cases, special sockets incompatible with ordinary sockets will have to be fitted to prevent inadvertent supply of non sensitive loads by the high quality distribution system.

In a preferred embodiment, the DC voltage applied to the distribution bus by the central module 1 is a non regulated DC voltage greater than twice the maximum AC voltage that has to be available at output from a terminal module. In the case where this maximum AC voltage is 220 V, i.e. of the same order as the voltage normally supplied by the AC distribution network, the DC voltage applied to the bus is ±350 V between the conductors 2 and 3. If the DC voltage is lower, bulky and costly auto-transformers have to be used in the DC-AC converters of the terminal modules 4, 5. If on the other hand the DC voltage is of sufficient amplitude, the terminal modules can comprise converters without a transformer.

In FIG. 1, a communication bus, represented schematically by 12, connects the central module 1 to each of the terminal modules 4, 5 and 6. The bus 12 can be formed by any state-of-the-art bidirectional communication bus, for example by field buses marketed under the brand-names BATIBUS and J-BUS. It is thus possible to transfer all the necessary data between modules. A connection 13 enables data to be transferred between the central module 1 and a monitoring device 14, external to the system. The monitoring device 14 can, as an alternative, be connected to the communication bus 12 without passing via the central module as illustrated by the dotted line shown in FIG. 1, possibly by means of an interface between the communication bus 12 internal to the system and an external communication bus which can be more elaborate. Connections 15, for example constituted by serial communication buses, enable data to be transmitted between each of the terminal modules and the associated loads. A connection 15 can, for example, be connected to a local network server. The terminal modules are in addition equipped with various communication means such as indicator lights, contacts, etc.

The communication means thus defined enable communication internal to the system, necessary to coordinate all the components making up the system, to be achieved. This internal communication is preferably completed on the one hand by a communication designed for the load, in audio-visual form (lamps, audio alarms, etc.) and/or electrical form (contacts, serial connections), and on the other hand by a communication designed for the system operator, either local or remote.

Figure 9:
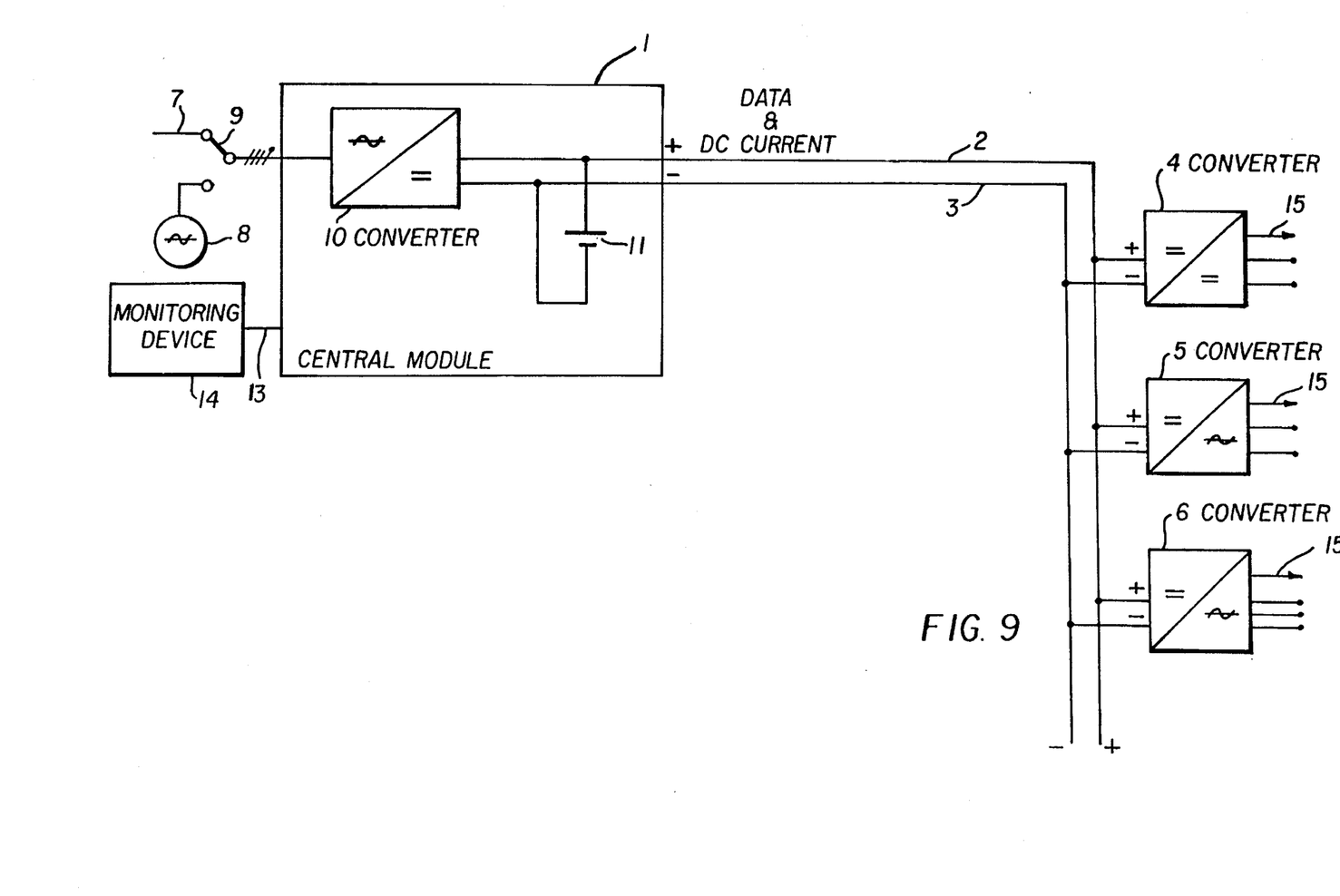
FIG. 9 is a schematic diagram of a system in accordance with the invention wherein data is transmitted as carrier current superposed over the direct current.

The communication bus can be made up of several buses for a large system or be replaced by any other communication means, for example by the use of the carrier current technique, the data to be transmitted then being superposed on the DC current in the distribution bus 2, 3 as illustrated in FIG. 9.

The monitoring device 14 can comprise a desk located near the central module, to enable notably routine or checking operations to be carried out. It can also comprise monitoring devices remotely located, notably on the premises of the system operator to inform the latter in case of a problem arising in the system. Communication between the central module, local desk and remote monitoring devices can be achieved by any means, for example by means of a bus as represented in FIG. 1, or by telephone, radio, minitel, etc.

Figure 2:
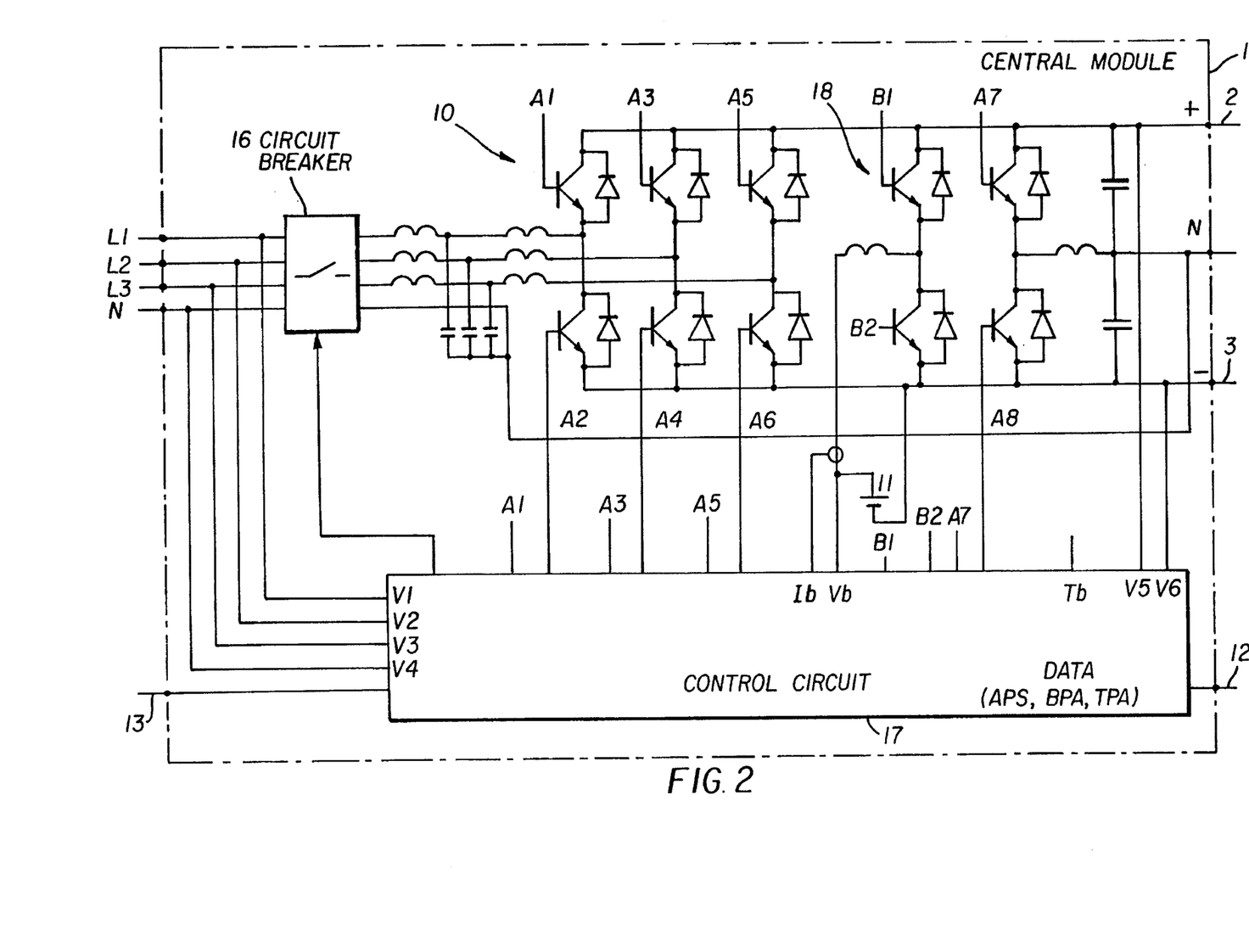
FIG. 2 represents a particular embodiment of the central module of the system according to FIG. 1.

FIG. 2 illustrates in greater detail a particular embodiment of the central module 1. The AC network connected to the module input is a three-phase network L1, L2, L3, with neutral N. The AC-DC converter 10 is connected to the AC network by means of a switch or circuit breaker 16 able to be operated manually or automatically by a control circuit 17 of the central module. The control circuit 17 receives on input signals V1 to V4 representative of the voltages applied to the module input (at L1, L2, L3 and N) and applies to control terminals A1 to A8 of the converter 10 appropriate control signals to supply the required DC voltages to the distribution bus. The distribution bus comprises a positive conductor 2, a negative conductor 3, and a neutral conductor N connected directly to the neutral of the line-side three-phase network. The converter 10 is designed in such a way as to supply on the conductors 2 and 3 a ±350 V voltage symmetrical with respect to the neutral N. This symmetry enables the complexity of the terminal modules to be reduced.

The converter can be controlled by the control circuit 17 so as to maintain a sine wave current in the line-side AC network. For this purpose, the circuit 17 is connected to current sensors (not represented) measuring the current in the line-side AC network conductors and compensating any disturbances of the sine wave shape that may occur.

The battery 11 is connected to the distribution bus 2, 3, N by means of a charger-regulator circuit 18 whose control terminals B1–B2 receive control signals from the control circuit 17. In the absence of a network failure, the battery 11 charges if necessary. The control circuit 17 monitors the battery charge taking account of the voltage at the battery terminals (input Vb of circuit 17) and of the battery charging current (input Ib of circuit 17), so as to limit this current during charging. In the embodiment represented in FIG. 2, the battery is charged from the DC voltage, but it is naturally possible to perform charging directly from the AC network using two independent rectifiers, one for charging the battery and the other for supply of the DC network.

The required power is therefore tapped from the public AC network, or from another autonomous source 8, by a rectifier, preferably with sine wave tapping in order not to disturb the line-side AC network. This power is partly used locally, in the central module 1, to maintain the battery 11 on charge. Most of this power is supplied to the DC distribution network in the form of DC current made available continuously by the battery.

When a failure of the AC network is detected by the control circuit 17 from the signals applied to its inputs V1–V4, it causes stopping of the control signals applied to the terminals A1 to A6 of the converter 10. The battery 11 then supplies the distribution bus via the charger-regulator 18, under the control of the circuit 17, according to the central module output voltages (inputs V4, V5, V6 of circuit 17). The control signals of terminals A7 and A8 are maintained to continue having a neutral voltage available.

The control circuit 17 also generates data representative of the state of the AC network (comparison of the AC network voltages with programmable thresholds), electrical generating set, and central module, and more particularly a signal (APS) indicative of operation on an autonomous power source. It notably monitors the battery back-up time from the measurements of Ib, Vb and of the battery temperature, which is supplied to it by a temperature sensor on an input Tb. It generates an end of back-up time pre-alarm signal (BPA) designed to inform the loads that the autonomous back-up power reserve of the system will soon come to an end. It can also monitor the correct operating state of the charger-regulator, the battery room temperature, and the degree of ageing of the battery. It can also perform anti-intrusion detection in the technical room where it is located. This data can be transmitted to the terminal modules by the communication bus 12 and to a monitoring device 14 via the connection 13, the control circuit 17 being provided with the necessary communication interfaces.

In addition, the control circuit 17 receives data from the terminal modules via the communication bus 12 and from the monitoring device 14 via the connection 13 and can process and transmit this data. For example, it can receive a forced switch to battery order, enabling the system to be tested, an anti-intrusion alarm activation order, etc.

Figure 3:
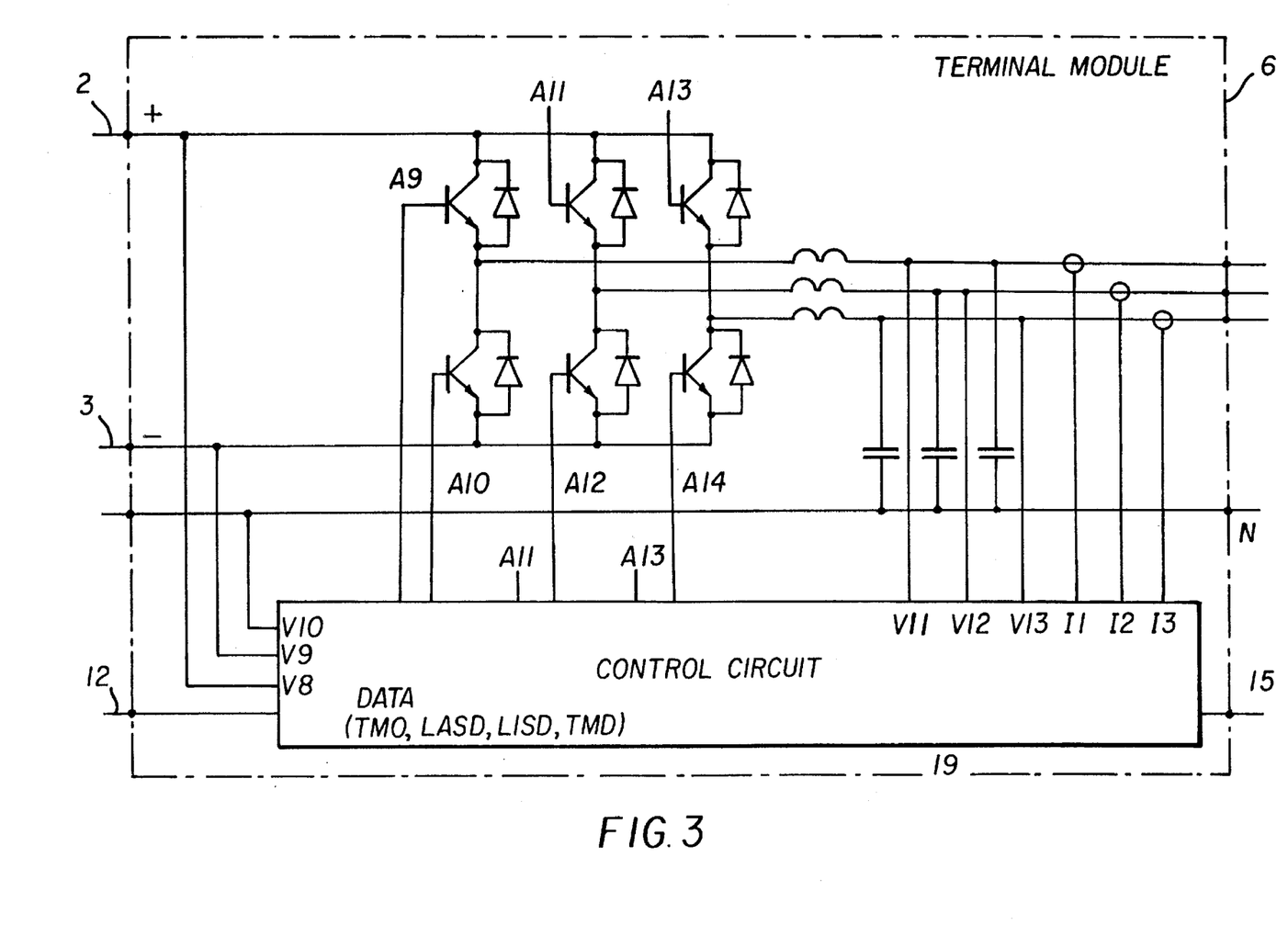
FIGS. 3 and 4 represent two particular embodiments of terminal modules of the system according to FIG. 1.

A three-phase DC-AC terminal module is represented in greater detail in FIG. 3. It comprises a control circuit 19 receiving on input signals representative of the DC input voltages (V8 to V10) which are applied to it by the distribution bus, with three wires (2, 3, N) in the particular embodiment represented, signals representative of the AC output voltages (V11 to V13 and V10 for the neutral common to the input and output), signals representative of the output currents (I1 to I3) and data which is transmitted to it by the bus 12 and possibly by the connection 15. The control circuit 19 generates from these input signals control signals A9 to A14 for the DC-AC converter and data representative of its state. Data transmission is achieved via suitable communication interfaces included in the control circuit 19.

Figure 4:
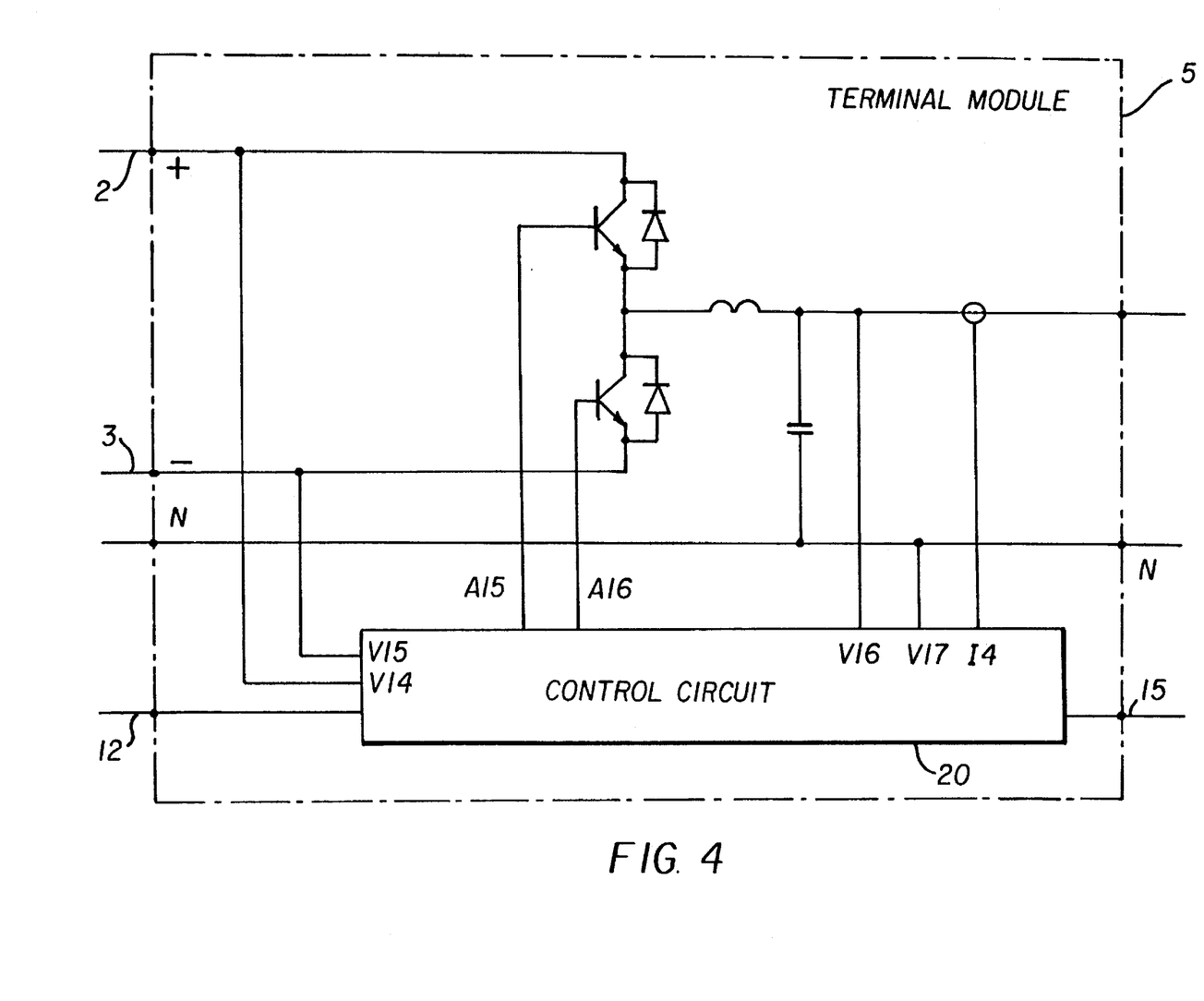

A single-phase DC-AC terminal module is represented in FIG. 4. In the same way as the above module, it comprises a control circuit 20 receiving on input signals representative of the DC input voltages (V14, V15, V17), of the AC output voltages (V16, V17), and of the output current (I4), and data transmitted by the bus 12 and connection 15. The control circuit 20 generates control signals A15 and A16 for the DC-AC converter and data representative of its state. As in the previous case, suitable communication interfaces are included in the control circuit 20.

The main data generated by the control circuit of a terminal module concerns:

Presence and correct operation of the terminal module and of its communication devices belonging to the control circuit, namely, terminal module operation data (TMO). As far as the communication devices are concerned, it monitors notably their power supply and correct addressing. The central module, or external monitoring device, periodically requests each terminal module for information in this respect.

Presence, within preset tolerance limits, of voltage load-side of the terminal module namely, load side data (LOSD).

Monitoring of the quality level of the high quality voltage, delivered to the load, notably in terms of amplitude, frequency, absence of breaks or distortion.

Presence or absence of overloads load-side of the terminal module, obtained by comparison of the signals representative of the output currents (I1 to I3; I4) with preset thresholds, which may be programmable. In the event of an overload, the control circuit of the terminal module can order load-shedding of certain devices which it supplies.

Presence, within preset tolerance limits, of DC voltage line-side of the terminal module, namely line side data (LISD).

Data, namely, terminal metering data (TMD) including voltages currents or power, enabling metering of the power delivered by the terminal module. It can generate impulses corresponding to a predetermined quantity of consumed power, for example 1 KWh.

It also transmits a shutdown request formulated by the load, which enables management of the high quality power at a higher hierarchical level (central module or monitoring device).

In addition, the control circuit of a terminal module receives data from the central module, via the communication network, notably when the central module switches over to back-up operation and in the case of an end of back-up time pre-alarm. A pre-alarm information indicates to the terminal module concerned that it will automatically have to stop after a preset time, for example after 2 minutes, whatever the state of the line-side DC distribution network. The back-up time assigned to each terminal module when a central module switches over to battery operation can be individualized, according to the load which is associated with it. This individualization can be performed at the level of the monitoring device 14, for example by means of a table indicating the back-up time assigned to each terminal module, which parameter can be modified. In this case, a pre-alarm signal (TPA) is generated by the central module for each terminal module to inform it that its back-up time will soon come to an end and for all the terminal modules when the battery reaches the end of its back-up time, as a safeguard, in the event of uncontrolled degradation of the battery or incorrect programming of the back-up time of a given module. Such a system has a great flexibility of operation and enables the size of the battery to be dimensioned by adding together the individual back-up time requirements of the loads. This leads to a large saving in comparison with simply taking into account a single back-up time, corresponding to the highest back-up time required, applied to all the terminal modules.

According to a preferred embodiment, not represented, a single communication bus of the BATIBUS type constitutes both the bus 12 and the connection 13, connected to the terminal modules and central module and to a substation belonging to the monitoring device 14. This substation houses the application software and the software for conversation with the other components of the monitoring device 14, for example a remote-operation interface by means of a JBUS type field bus. Several substations can be connected to a single remote-operation interface. The remote-operation interface is connected to various control devices located locally, for example a console or minitel, or remotely, for example by means of the telephone system.

The monitoring device 14 thus enables local or remote setting of the parameters of the high quality power distribution system. It notably enables identification of the various terminal modules, individualization of their back-up times, definition of the data to be considered as events, faults or alarms, and identification of the numbers to be called in the event of an alarm and, possibly, automatic calling of these numbers. It also centralizes the data to be logged and/or transmitted and, in particular, the data concerning operation of the various system components (overload, quality tolerance, etc.) and power metering. The communication interface is also, preferably, connected to a local printer enabling the various events and alarms to be logged with their dates and times.

The monitoring device can also receive external calls to consult the state of the system and, possibly, give it orders, for example on/off of a terminal module of a given address, battery test, etc.

Figure 5:
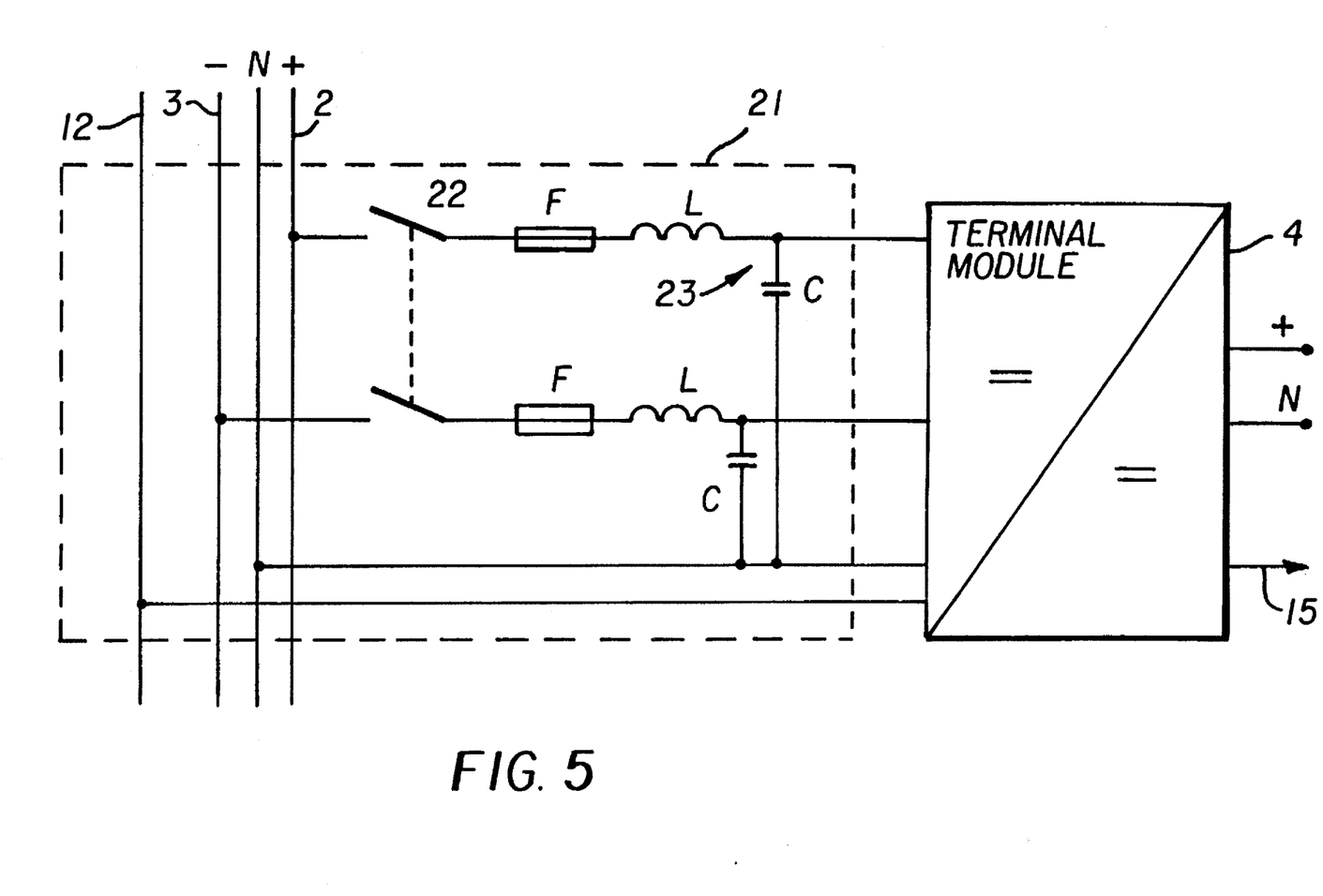
FIG. 5 represents a connection box for connection of a terminal module to the distribution bus.

The use of filters line-side of each terminal module enables network interference and disturbances between loads to be reduced to a minimum. FIG. 5 illustrates a preferred embodiment wherein each terminal module, only one 4 of which is represented, is connected to the distribution bus by means of a connection box 21. The connection box 21 houses a switchgear device, switch 22, enabling the terminal module to be switched on or off. This switchgear device can be operated manually or by remote control, for example in the case where a fault has been detected in operation of the terminal module 4, so as to isolate it from the system. The box 21 also houses a low-pass filter 23, for example of the LC type, connected between each of the distribution bus conductors 2 and 3 and the corresponding module input. A protective device, for example a fuse F, is connected in each conductor connecting the distribution bus conductors 2 and 3 and the corresponding input. This protective device may if required be incorporated in the terminal module rather than in the connection box.

To improve the availability of the system from the viewpoint of the loads, redundancy of certain components can be used.

Figure 6:
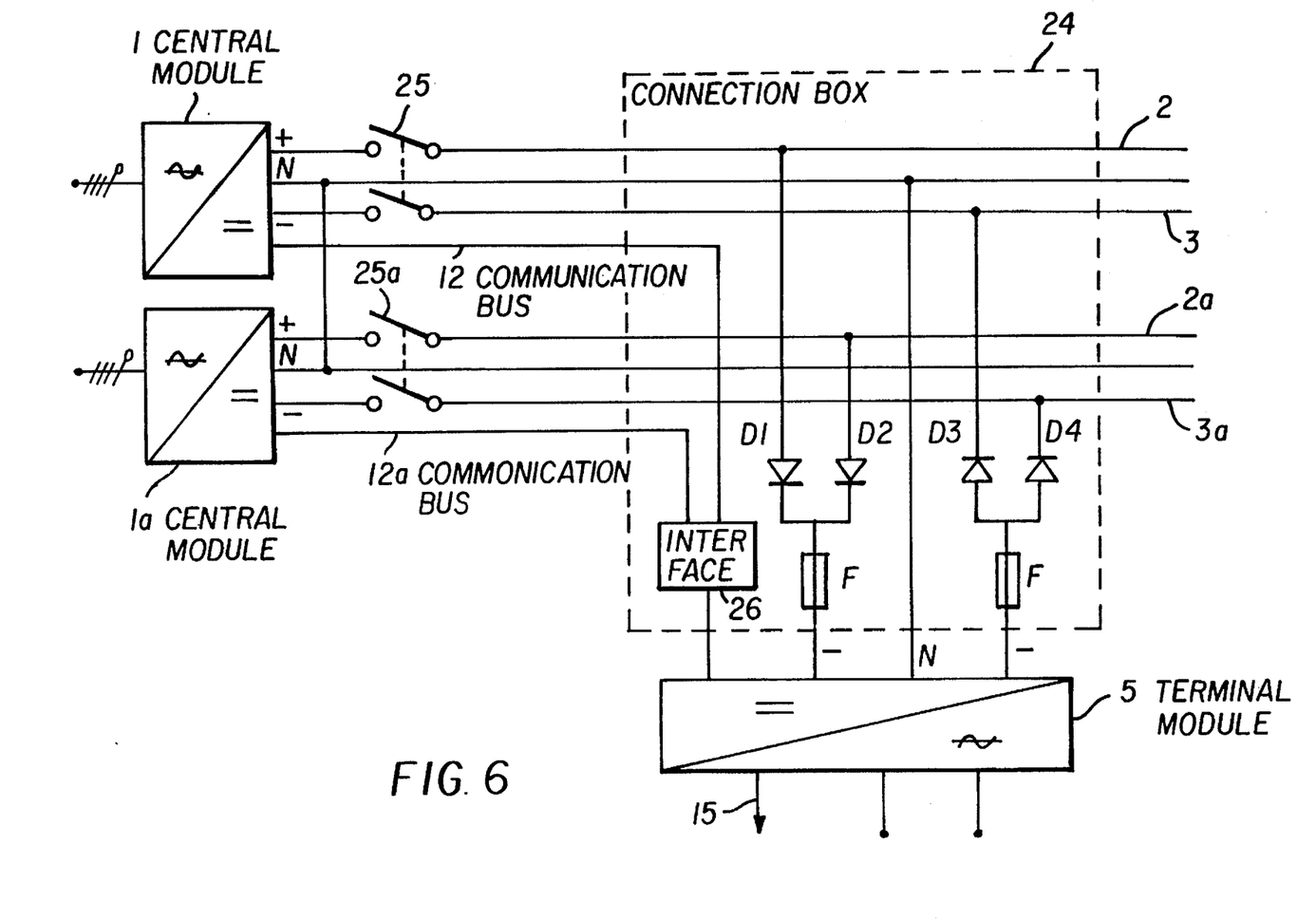
FIG. 6 illustrates a redundant distribution system.

FIG. 6 illustrates an example of a redundant distribution system comprising two central modules 1 and 1a. Each terminal module is connected in parallel to the distribution bus 2, 3, N and 2a, 3a, N connected to the two central modules by a connection box 24. A switchgear device 25 or 25a, formed by an electromechanical or solid-state circuit breaker or by a fuse, is provided on each of the conductors 2, 3, 2a, 3a of the distribution bus line-side from the first connection boxes 24. In the event of a malfunction of one of the central modules, the corresponding switchgear device is opened. In the connection box, the positive input (+) of the terminal module 5 is connected, via a fuse F, to the cathode of two diodes D1 and D2 whose anodes are respectively connected to the conductors 2 and 2a. Likewise, the negative input (−) of the terminal module is connected, via a fuse F, to the anode of two diodes D3 and D4 whose respective cathodes are connected to the conductors 3 and 3a. The neutral input (N) of the terminal module is connected to the neutral conductors of the two buses, whereas its communication input is connected to the communication buses 12 and 12a associated with the two central modules by means of a suitable interface 26, which may be integrated in the terminal module. Switches similar to the switches 22 of the connection box 21 in FIG. 5 can be provided in the box 24 to isolate the terminal module from the two distribution buses. Likewise filters are preferably provided in the connection box or integrated in the terminal module.

The redundancy principle can be applied to other system components. A redundant system can thus be achieved comprising a single central module only, but whose distribution bus is doubled at its output from the central module to provide two distribution buses to which the terminal modules are connected in the same way as in FIG. 6.

Figure 7:
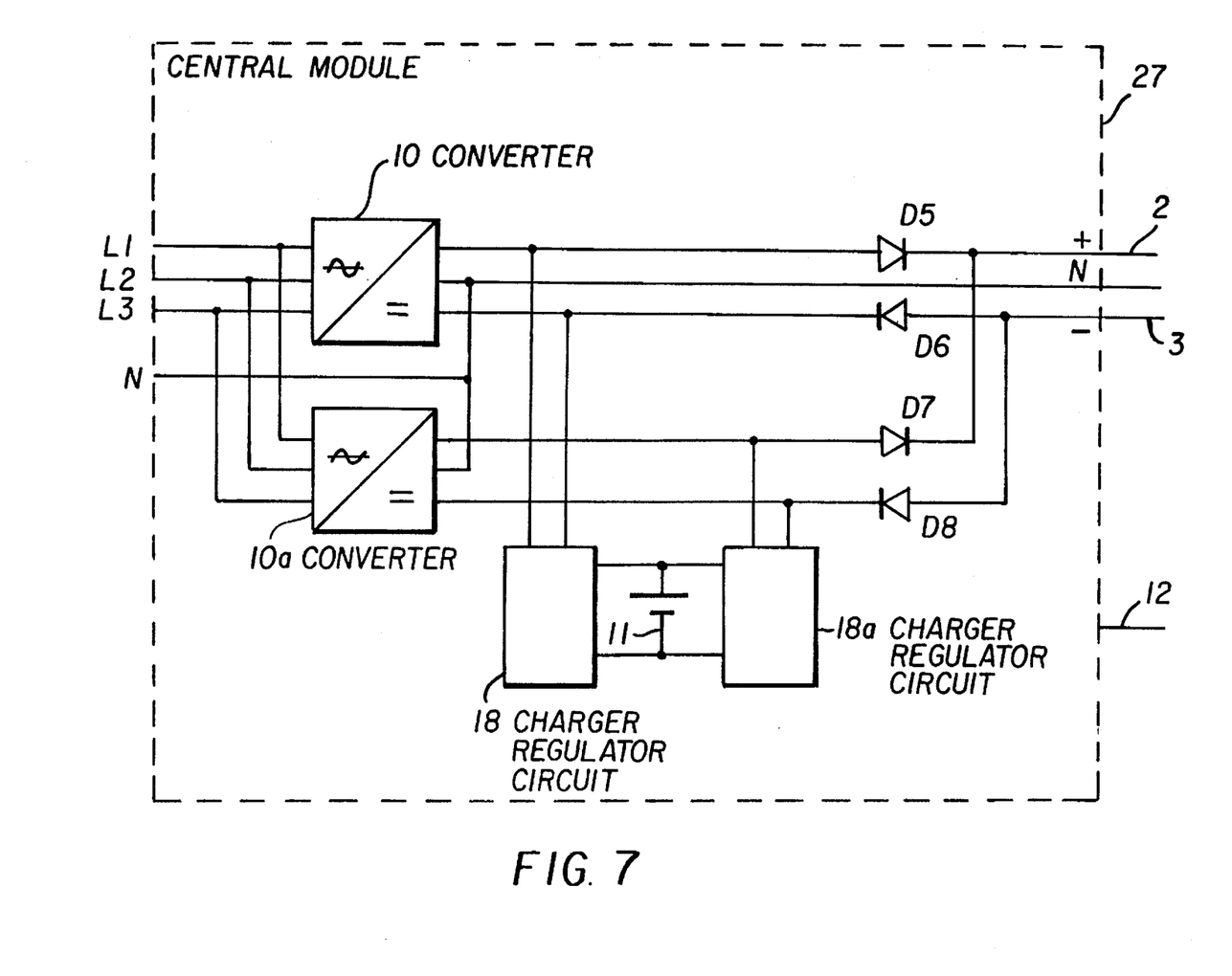
FIG. 7 represents a redundant central module.

Redundancy can also be used inside the central module, as represented in FIG. 7, notably for maintenance purposes. Two converters 10 and 10a are supplied by the same input AC network L1, L2, L3, N. Their outputs are connected in parallel by means of diodes D5 to D8 to supply a single distribution bus 2, 3, N. The central module 27 represented comprises a single battery 11 connected by means of two charger-regulator circuits 18 and 18a respectively to the outputs of two converters 10 and 10a, line-side from their connection to the distribution bus.

The availability of the redundant central module in FIG. 7 can be further improved by the use in the module of two batteries supplied separately, one by the converter 10 and the other by the converter 10a.

The system can, in addition, comprise a synchronization link (FIG. 8) connecting a time base, acting as synchronization source 29, to each of the terminal modules comprising a DC-AC converter. Physically this time base 29 can if required be located in the central module 1. The central module 1 sends to each of the terminal modules comprising a DC-AC converter, data, via the communication bus 12, enabling it to synchronize on the synchronization signals supplied by the source 29, with a phase shift adapted to suit each of the converters. The central module can thus distribute over time the current peaks absorbed by the different converters on the DC distribution bus, which enables the by-pass capacitors to be reduced to a minimum.

Figure 8:
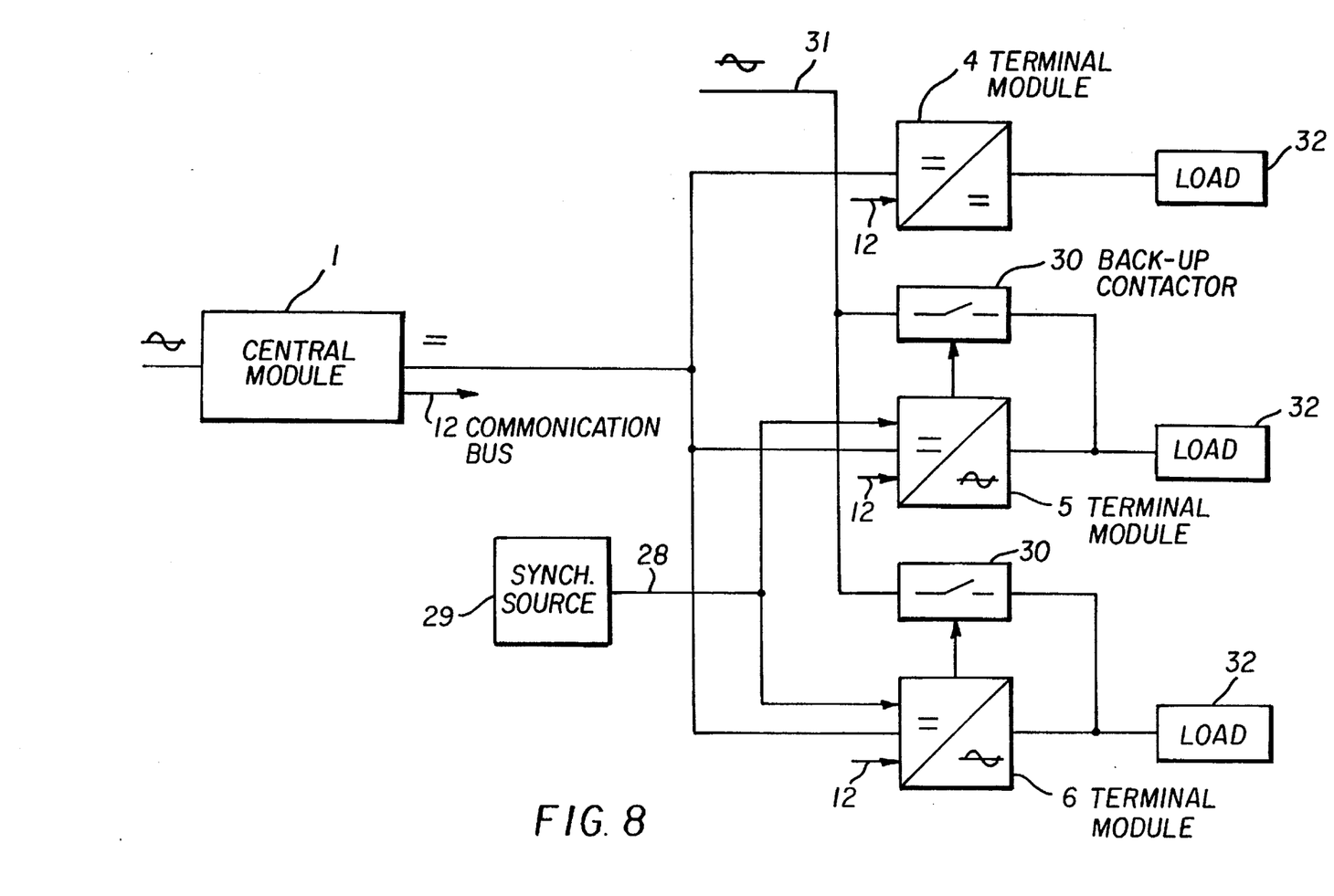
FIG. 8 illustrates schematically another particular embodiment of the system.

To increase the availability of the system, it is possible to provide a back-up contactor 30 associated with each DC-AC converter. The input of the back-up contactors 30 is connected by a connecting line 31 to an AC voltage source, not represented. This AC voltage source can be formed by the output of a conventional UPS connected to the AC network. The output of a back-up contactor 30 is connected, in parallel with the output of the associated converter, to the input of the associated load 32. The back-up contactor 30 is controlled by the control circuit of the associated terminal module, taking into account the synchronization signals and the data supplied to the control circuit by the communication bus 12, so as to synchronize in the most suitable manner switching of the power supply of the load 32 from the terminal module to the back-up contactor or vice-versa. It is thus possible to deal with brief overloads or back-up the converter in case of failure. The back-up contactors are preferably static contactors, which are faster than electro-magnetic contactors.

We claim:

1. A system for distribution of high quality electrical power to a plurality of loads from an AC electrical power distribution network, said system comprising:

a central module for converting alternating current of the AC network into direct current, said central module comprising at least one autonomous back-up DC power source so as to constitute a permanent DC power source;

a DC distribution network connected to the central module for distributing direct current received from the central module;

a plurality of terminal modules connected to receive direct current from the DC distribution network, wherein each of the plurality of terminal modules is connected to a corresponding one of the plurality of loads which are to receive power from the system, each of the plurality of terminal modules includes conversion means for converting the direct current received from the DC distribution network into at least one of a predetermined high quality AC and DC current suitable for the corresponding load connected thereto, and each of the plurality of loads are functionally isolated from each other by the terminal modules; and communication means for communicating data representative of the state of the system at least between each terminal module and the central module;

wherein the data representative of the state of the system comprises data representing a signal indicating operation of the central module from the autonomous power source and data representing an end of back-up time pre-alarm signal.

2. The system according to claim 1, wherein the central module supplies a symmetrical DC voltage with respect to a neutral of the AC network, the DC distribution network comprising three conductors including a neutral conductor directly connected to the AC network neutral.

3. The system according to claim 1, wherein each terminal module is connected to the DC distribution network by means of an associated connection box containing low-pass filters and means for protection against short-circuits 4.

4. The system according to claim 1, wherein the communication means comprise a communication bus distinct from the DC distribution network.

5. The system according to claim 1, wherein communication is achieved by means of carrier currents superposed on the direct current on the DC distribution network.

6. The system according to claim 1, wherein the end of back-up time pre-alarm signal is representative of the end of back-up time of the autonomous back-up DC power source.

7. The system according to claim 1, wherein the pre-alarm signal is representative of the end of back-up time of one of the terminal modules, a predetermined back-up time being assigned to each of the terminal modules.

8. The system according to claim 1, wherein the data representative of the state of the system comprise data representative of the presence and correct operation of the terminal modules.

9. The system according to claim 1, wherein the data representative of the state of the system comprise data representative of the presence, within preset tolerances, of a voltage line-side of the terminal modules and of voltage and current load-side of the terminal modules.

10. The system according to claim 1, wherein the data representative of the state of the system comprise data concerning metering of the power delivered by each terminal module to an associated load.

11. The system according to claim 1, wherein the communication means are connected to a centralized monitoring device external to the system.

12. The system according to claim 1, wherein the DC distribution network is a bus.

13. The system according to claim 1, said system further comprising synchronization means connected to the terminal modules converting the direct current into alternating current.

14. The system according to claim 1, further comprising a redundant central module and means for connecting the redundant central module to the DC distribution network in the event of a failure of the central module.

15. The system according to claim 1, wherein the central module includes first and second converters respectively coupled to first and second charger regulator circuits.

* * * * *